US011824337B1

(12) United States Patent
Bennett (10) Patent No.: US 11,824,337 B1
(45) Date of Patent: Nov. 21, 2023

(54) CABLE MANAGEMENT ASSEMBLY

(71) Applicant: Brandon Bennett, Edmonton (CA)

(72) Inventor: Brandon Bennett, Edmonton (CA)

( * ) Notice: Subject to any disclaimer, the term of this patent is extended or adjusted under 35 U.S.C. 154(b) by 0 days.

(21) Appl. No.: 17/964,897

(22) Filed: Oct. 12, 2022

(51) Int. Cl.
*H02G 3/04* (2006.01)
*F16L 3/01* (2006.01)

(52) U.S. Cl.
CPC ............ *H02G 3/0456* (2013.01); *F16L 3/012* (2013.01)

(58) Field of Classification Search
CPC .... F16L 3/012; F16L 3/11; F16L 3/14; H02G 3/0456; H02G 3/30; H02G 3/32; H02G 3/34; H02G 11/02
See application file for complete search history.

(56) References Cited

U.S. PATENT DOCUMENTS

| | | | | |
|---|---|---|---|---|
| 3,763,368 A * | 10/1973 | Baggott | ................ | F21V 21/16 248/331 |
| 4,018,514 A | 4/1977 | Plummer | | |
| 5,323,988 A * | 6/1994 | Handler | ................ | F16L 3/22 248/68.1 |
| 5,357,052 A | 10/1994 | Hakeem | | |
| 5,704,571 A * | 1/1998 | Vargo | ................ | F16L 3/2431 248/68.1 |
| 5,730,400 A * | 3/1998 | Rinderer | ............. | H02G 3/0418 248/68.1 |
| 6,198,047 B1 * | 3/2001 | Barr | ................ | H02G 3/0456 174/101 |
| 6,483,025 B1 * | 11/2002 | Samsi | ................ | H02G 3/0456 248/68.1 |
| 6,547,192 B2 * | 4/2003 | Rinderer | ............. | H02G 3/0608 248/58 |
| 7,470,867 B1 * | 12/2008 | Cope | ................ | H02G 3/00 174/101 |
| 8,853,541 B2 | 10/2014 | Ingram, Sr. | | |
| 10,179,598 B1 | 1/2019 | Goodbinder | | |
| 10,439,657 B2 | 10/2019 | Pillai | | |
| 11,018,487 B2 | 5/2021 | Byrne | | |
| 2013/0014985 A1 | 1/2013 | Ferrara | | |

FOREIGN PATENT DOCUMENTS

| | | | | |
|---|---|---|---|---|
| AT | 500069 A1 * | 10/2005 | ................ | F16L 3/04 |
| EP | 0033869 | 11/1980 | | |
| KR | 100761047 B1 * | 9/2007 | ................ | F16L 3/04 |

* cited by examiner

*Primary Examiner* — Eret C McNichols (57) ABSTRACT

A cable management assembly includes a fastener that is attachable to a ceiling of a room. A mounting unit is provided that is matable to the fastener having the mounting unit abutting the ceiling. A cylinder is attached to the mounting unit and a tube is rotatably attached to the cylinder thereby facilitating the tube to be rotated about a central axis of the cylinder. A plurality of cable retractors is provided and each of the cable retractors is coupled to the tube. Each of the cable retractors is biased to retract toward the tube and each of the cable retractors is urgeable into a lengthened condition for extending away from the tube. Each of the cable retractors releasably engages a power cord of a virtual reality headset to inhibit a user of the virtual reality headset from tripping over the power cord of the virtual reality headset.

11 Claims, 6 Drawing Sheets

CABLE MANAGEMENT ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to cable management device and more particularly pertains to a new cable management device for inhibiting a user from tripping on a power cord of a virtual reality headset. The device includes a mounting unit that is attachable to a ceiling of a room and a tube that is rotatably disposed on the mounting unit. The device includes a plurality of cable retractors that are each attached to the tube which each releasably engages a power cord of a virtual reality headset. In this way the power cord of the virtual reality headset is suspended from the ceiling of the room to inhibit a user from tripping on the power cord.

(2) Description of Related Art Including Information Disclosed Under 37 CFR 1.97 and 1.98

The prior art relates to cable management devices including a retinal photography device that includes a harness suspended from a ceiling, a head-mounted opthalmoscope suspended from the harness and a hand held lens. The prior art discloses a power cord bracket that includes a first portion being mountable to vertical surface and a second portion extending away from the vertical surface. The prior art discloses a power cord hanger that includes a hanger that is mounted to and extends downwardly from a ceiling for hanging a power cord of a vacuum cleaner. The prior art discloses a ceiling mounted outlet assembly that includes a plurality of members suspended from a ceiling and a power strip attached to the members.

BRIEF SUMMARY OF THE INVENTION

An embodiment of the disclosure meets the needs presented above by generally comprising a fastener that is attachable to a ceiling of a room. A mounting unit is provided that is matable to the fastener having the mounting unit abutting the ceiling. A cylinder is attached to the mounting unit and a tube is rotatably attached to the cylinder thereby facilitating the tube to be rotated about a central axis of the cylinder. A plurality of cable retractors is provided and each of the cable retractors is coupled to the tube. Each of the cable retractors is biased to retract toward the tube and each of the cable retractors is urgeable into a lengthened condition for extending away from the tube. Each of the cable retractors releasably engages a power cord of a virtual reality headset to inhibit a user of the virtual reality headset from tripping over the power cord of the virtual reality headset.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
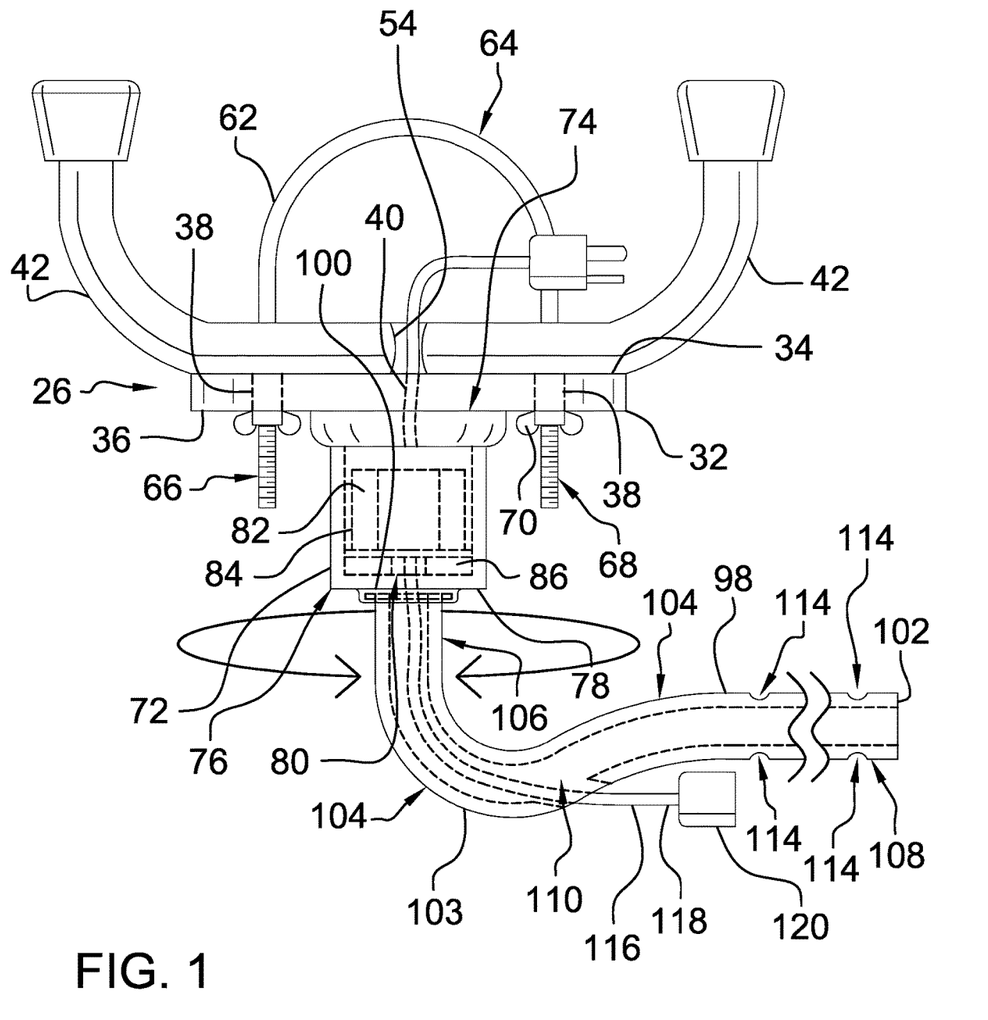
FIG. 1 is a perspective phantom view of a cable management assembly according to an embodiment of the disclosure.
Figure 2:
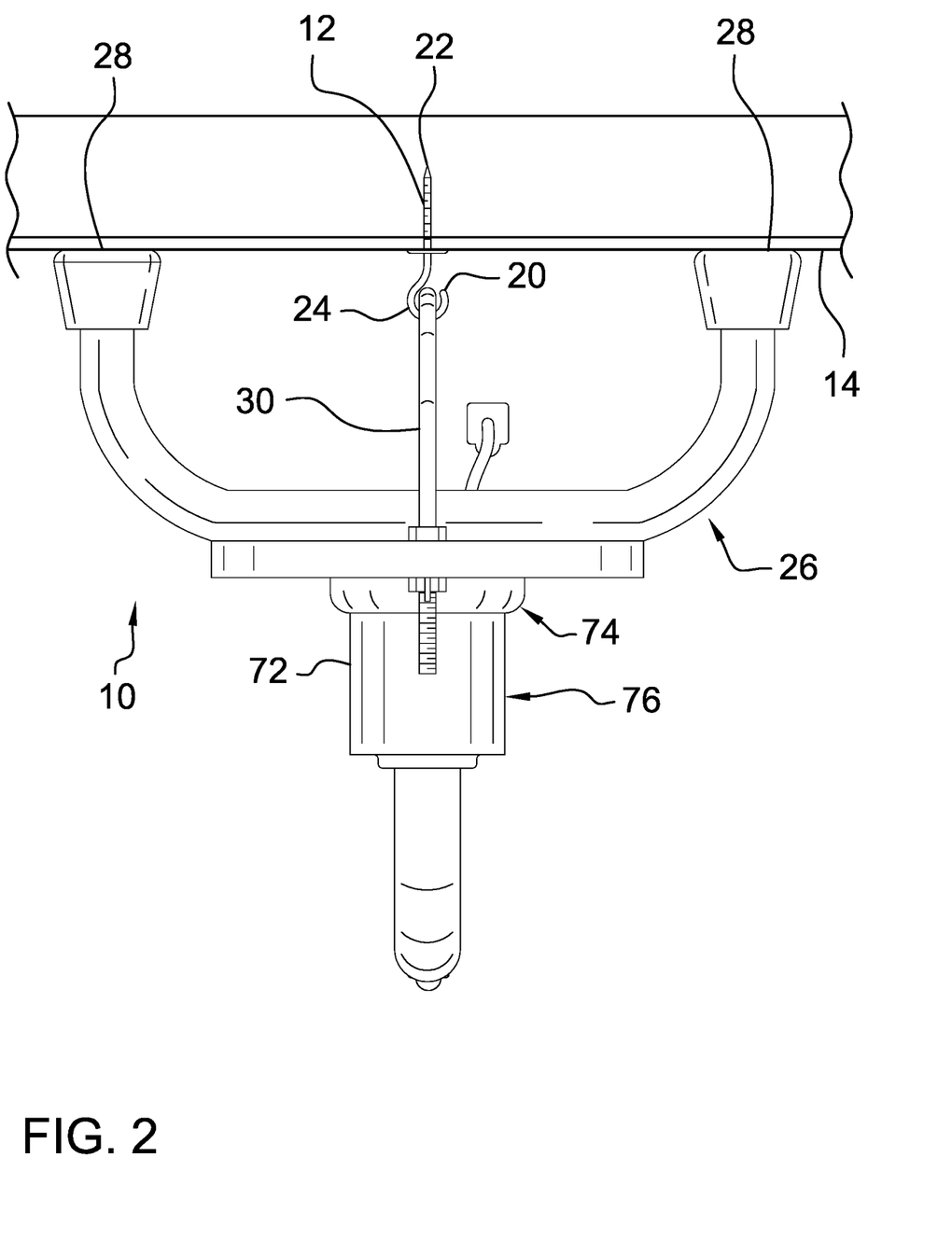
FIG. 2 is a back view of an embodiment of the disclosure.
Figure 3:
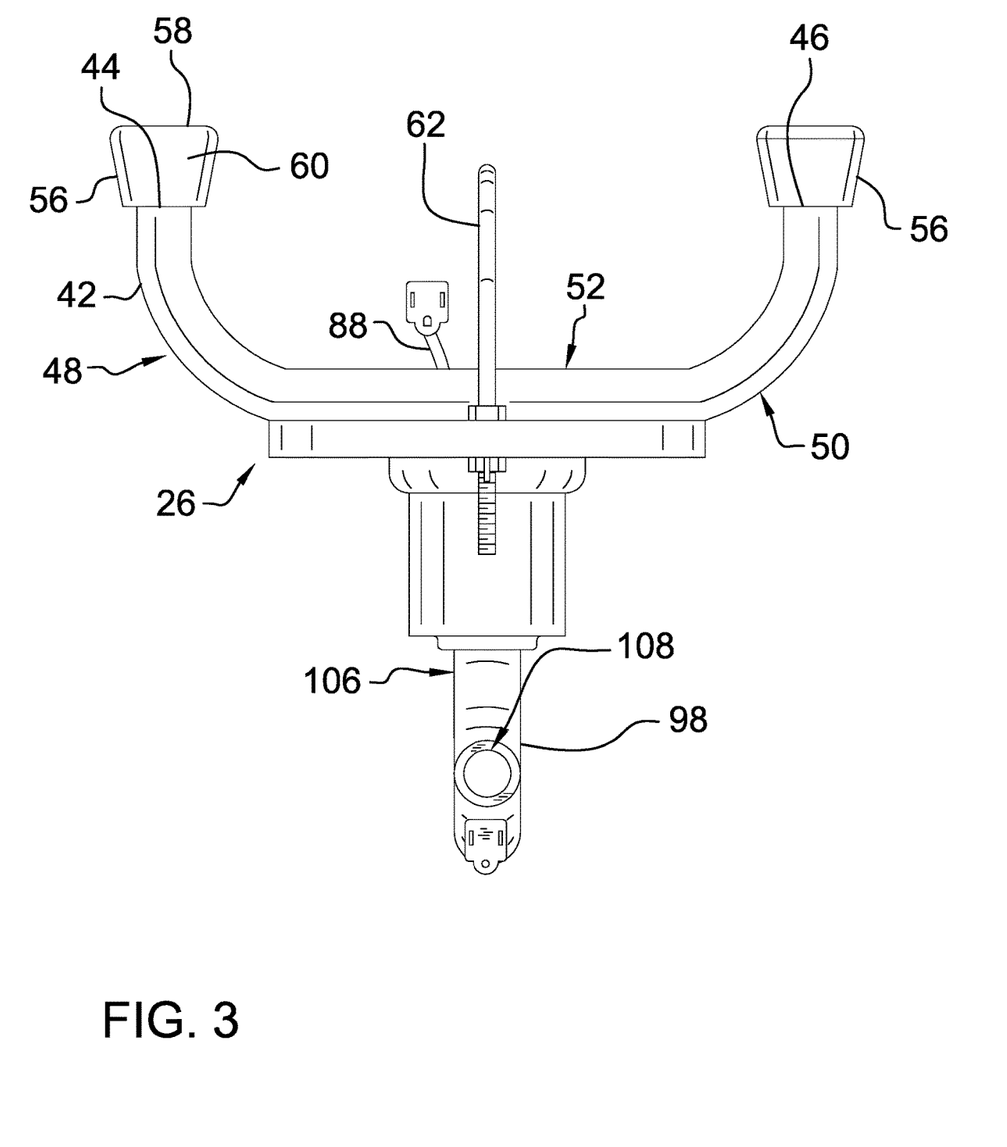
FIG. 3 is a front view of an embodiment of the disclosure.
Figure 4:
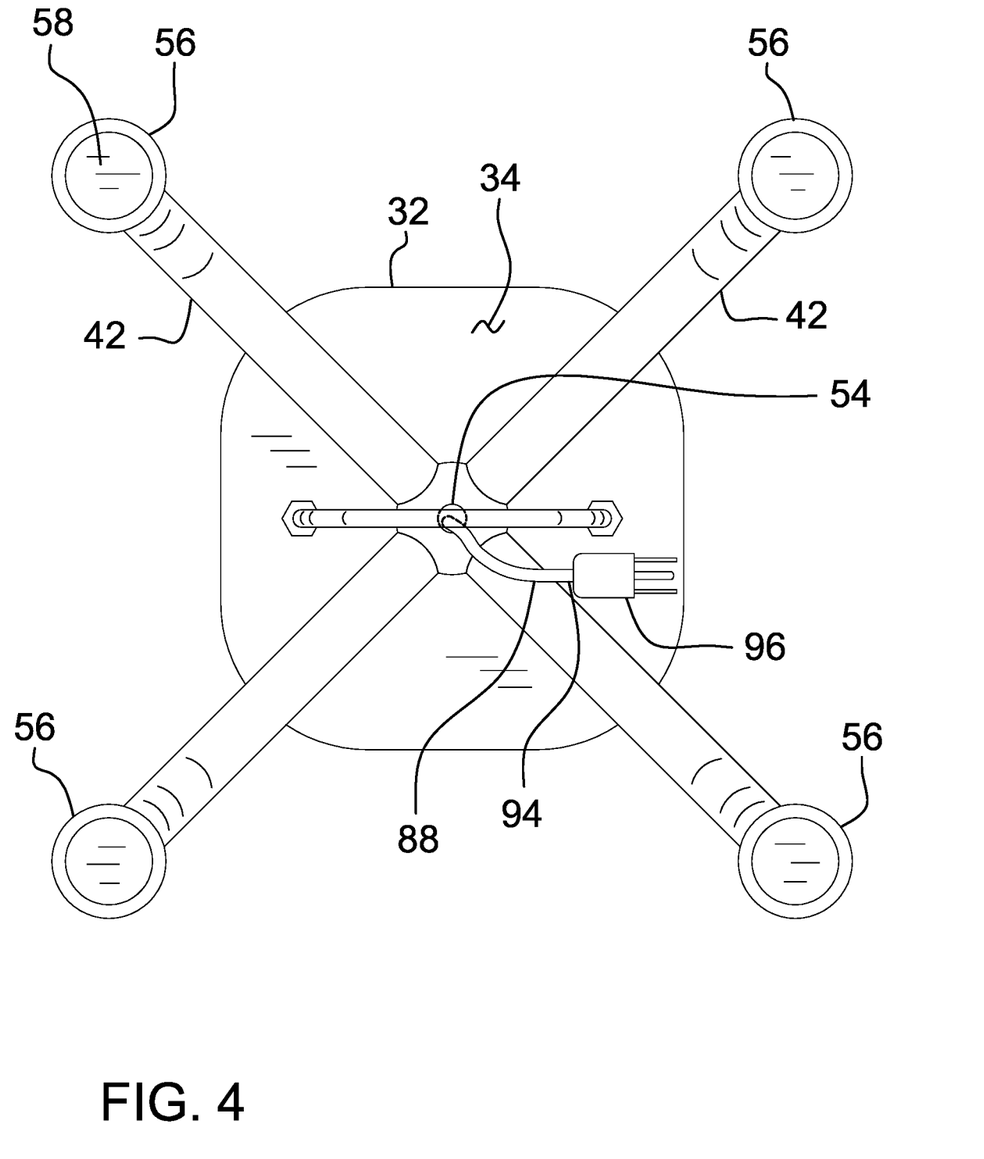
FIG. 4 is a top view of an embodiment of the disclosure.
Figure 5:
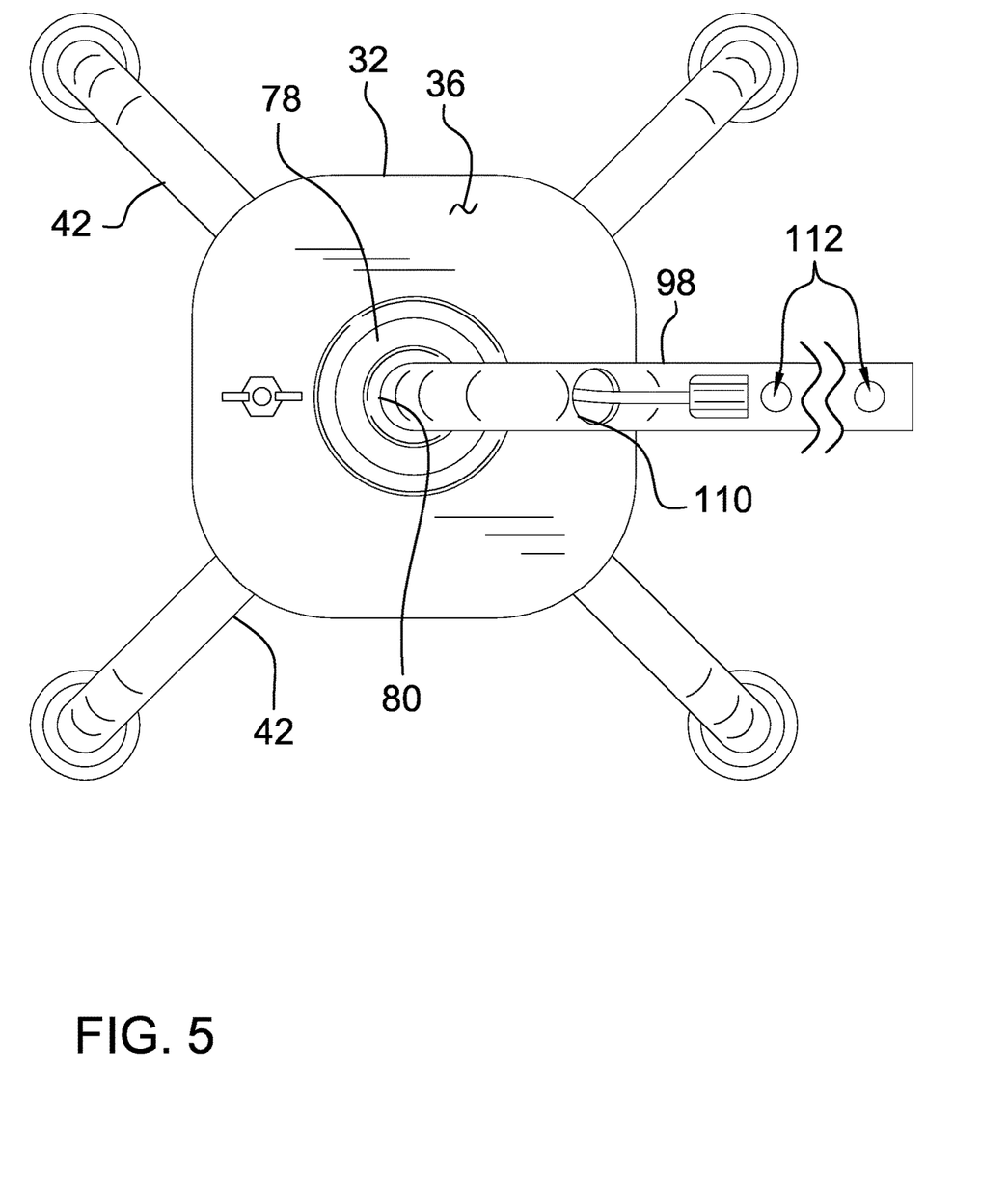
FIG. 5 is a bottom view of an embodiment of the disclosure.
Figure 6:
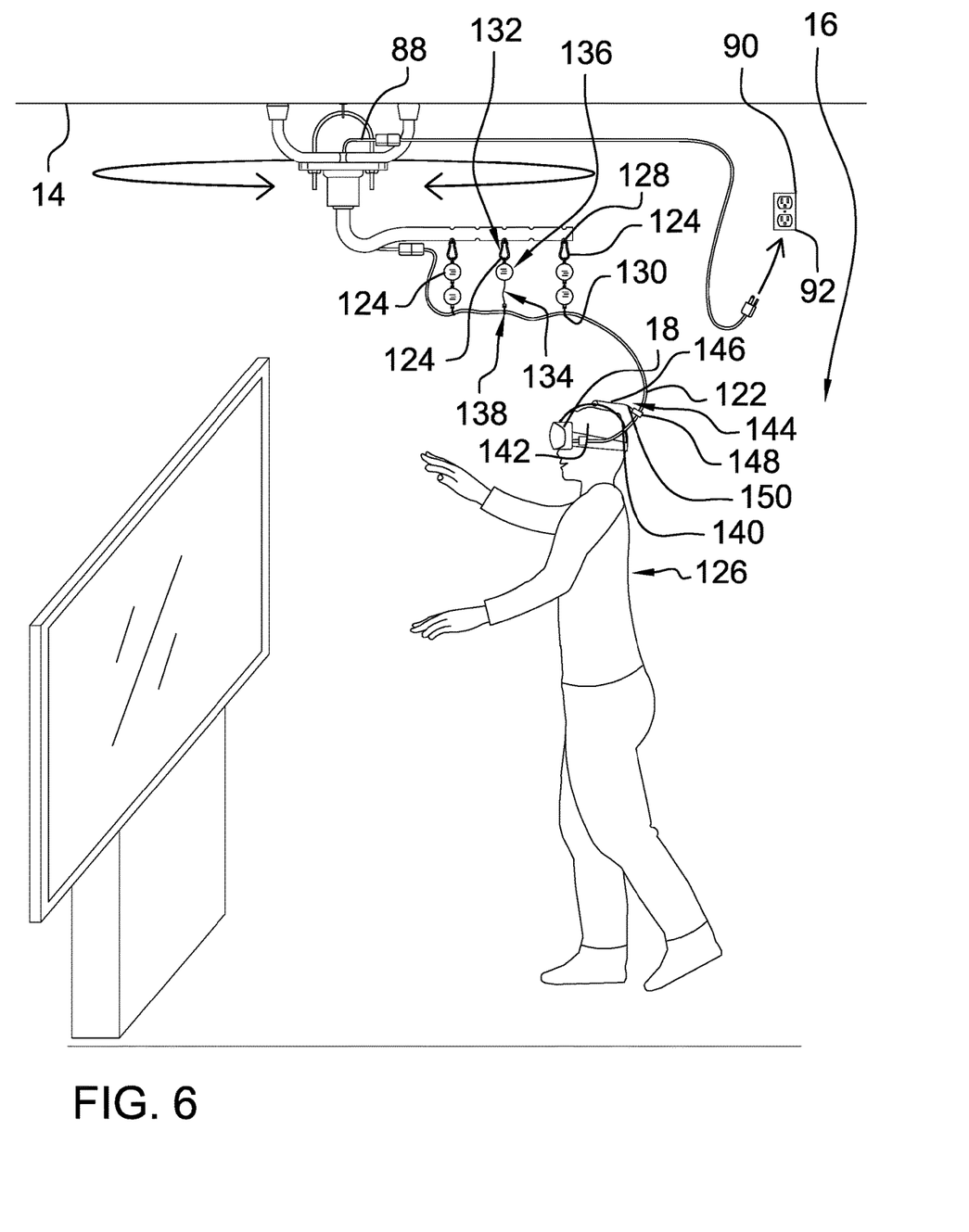
FIG. 6 is a perspective in-use view of an embodiment of the disclosure.

With reference now to the drawings, and in particular to FIGS. 1 through 6 thereof, a new cable management device embodying the principles and concepts of an embodiment of the disclosure and generally designated by the reference numeral 10 will be described.

As best illustrated in FIGS. 1 through 6, the cable management assembly 10 generally comprises a fastener 12 that is attachable to a ceiling 14 of a room 16. The room 16 may be a living room in a house, for example, or other room in which a virtual reality headset 18 is employed for entertainment purposes. The fastener 12 has a first end 20 and a second end 22, and the fastener 12 has a curve 24 integrated therein extending from the first end 22 toward the second end 22 such that the first end 22 is directed toward the second end 22 thereby facilitating the fastener 12 to define a hook. The fastener 12 is threaded adjacent to the second end 22 thereby facilitating the second end 22 to penetrate the ceiling 14 having the fastener 12 threadably engaging the ceiling 14.

A mounting unit 26 is included which has a plurality of feet 28 and a coupler 30. The coupler 30 is matable to the fastener 12 having each of the feet 28 abutting the ceiling 14. The mounting unit 26 comprises a plate 32 has a top surface 34 and a bottom surface 36, and the plate 32 has a plurality of holes 38 each extending through the top surface 34 and the bottom surface 36. The holes 38 are positioned on opposing sides of a center of the plate 32. The plate 32 has an aperture 40 extending through the top surface 34 and the bottom surface 36 and the aperture 40 is centrally positioned on the plate 32.

A plurality of arms 42 is provided that each has a primary end 44 and a secondary end 46, and each of the arms 42 has a first curve 48 that is spaced from the primary end 44. Each of the arms 42 has a second curve 50 that is spaced from the secondary end 46 such that each of the arms 42 has a U-shape. A central portion 52 of each of the arms 42 is attached to the top surface 34 of the plate 32 such that each of the primary end 44 and the secondary end 46 of each of the arms 42 is directed upwardly from the top surface 34. The pair of arms 42 is oriented on the top surface 34 of the plate 32 such that the central portion 52 of each of the arms 42 defines an X-shape. The plurality of arms 42 has an aperture 54 extending through the central portion 52 of each of the arms 42 and the aperture 54 in the plurality of arms 42 is aligned with the aperture 40 in the plate 32.

A plurality of cups 56 is provided and each of the cups 56 has a top wall 58 and an outer wall 60 extending downwardly from the top wall 58. Each of the cups 56 insertably receives a respective one of the primary end 44 or the secondary end 46 of a respective one of the arms 42 such that the top wall 58 of each of the cups 56 defines a respective one of the feet 28 associated with the mounting unit 26 thereby facilitating the top wall 58 to abut the ceiling 14. Each of the cups 56 is comprised of a resiliently compressible material thereby facilitating the top wall 58 of each of the cups 56 to frictionally engage the ceiling 14.

A U-bolt 62 is provided which has a curved portion 64 extending between each of a first threaded portion 66 and a second threaded portion 68. Each of the first threaded portion 66 and the second threaded portion 68 is extendable through a respective one of the holes 38 in the plate 32 having the curved portion 64 being spaced from the top surface 34 of the plate 32 such that the U-bolt 62 defines the coupler. Additionally, the curved portion 64 is positionable in the curve of the fastener 12 thereby securing the mounting unit 26 to the ceiling 14. The mounting unit 26 includes a pair of nuts 70 that is each threadable onto a respective one of the first threaded portion 66 and the second threaded portion 68 of the U-bolt 62 having each of the nuts 70 abutting the bottom surface 36 of the plate 32 for securing the U-bolt 62 in the plate 32.

A cylinder 72 is attached to the mounting unit 26 and the cylinder 72 has an upper portion 74 that is fixed to the mounting unit 26 and a lower portion 76 that is attached to the upper portion 74. The upper portion 74 is attached to the bottom surface 36 of the plate 32 and the lower portion 76 extends downwardly from the upper portion 74. The lower portion 76 has a distal end 78 with respect to the upper portion 74, the cylinder 72 is substantially hollow and the distal end 78 has an opening 80 extending into an interior of the cylinder 72. A contact plate 82 is positioned within the lower portion 76 of the cylinder 72 and the contact plate 82 is comprised of an electrically conductive material. A collar 84 is rotatably disposed within the cylinder 72 and the collar 84 is positioned between the contact plate 82 and the distal end 78 of lower portion 76 of the cylinder 72. The collar 84 is comprised of an electrically conductive material and the collar 84 is in electrical communication with the contact plate 82. A bearing 86 is positioned within the cylinder 72, the bearing 86 is positioned between the collar 84 and the distal end 78 of the lower portion 76 of the cylinder 72 and the bearing 86 surrounds the opening 80 in the distal end 76 of the lower portion 78 of the cylinder 72.

A first power cord 88 is integrated into the mounting unit 26 thereby facilitating the first power cord 88 to be plugged into a power source 90 comprising a female electrical outlet 92. The first power cord 88 is electrically coupled to the contact plate 82 in the cylinder 72 and the first power cord 88 has a distal end 94 with respect to the mounting unit 26. A male plug 96 is electrically coupled to the distal end 94 of the first power cord 88 such that the male plug 96 is pluggable into the female electrical outlet 92. A tube 98 is rotatably attached to the cylinder 72 thereby facilitating the tube 98 to be rotated about a central axis of the cylinder 72. The tube 98 has a coupled end 100, a free end 102 and an outer wall 103 extending between the coupled end 100 and the free end 102. The tube 98 has a pair of curves 104 that is each spaced from the coupled end 100 and each of the curves 104 has a radius that is opposed with each other to define a first portion 106 of the tube 98 is perpendicularly oriented to a second portion 108 of the tube 98.

The coupled end 100 is associated with the first portion 106 and the free end 102 is associated with the second portion 108. The first portion 106 extends through the opening in the distal end of the cylinder 72 and extends through the bearing in the cylinder 72. The coupled end 100 is attached to the collar 84 such that the tube 98 is rotatably retained on the cylinder 72 having the second portion 108 of the tube 98 extending along an axis that is oriented parallel with the bottom surface 36 of the plate 32. The outer wall 103 of the tube 98 has an exit 110 extending into an interior of the tube 98 and the exit 110 is aligned with a respective one of the curves 104 in the tube 98. The outer wall 103 of the tube 98 has a plurality of adjustment holes 112 each extending into the interior of the tube 98. The plurality of adjustment holes 112 is arranged into a plurality of pairs of the adjustment holes 114. Each of the pairs of adjustment holes 114 is positioned on opposite sides of the outer wall 103 of the tube 98 with respect to each other such that each of the pairs of adjustment holes 114 is aligned with each other. Additionally, the pairs of adjustment holes 114 are spaced apart from each other and are distributed along the second portion 108 of the tube 98.

A second power cord 116 extends through the tube 98 and into the cylinder 72 and the second power cord 116 is in electrical communication with the first power cord 88. In this way the second power cord 116 can receive electrical power from the female electrical outlet. The second power cord 116 is pluggable into a virtual reality headset 18 thereby facilitating the second power cord 116 to supply electrical power to the virtual reality headset 18. The virtual reality headset 18 may comprise a virtual reality headset of any conventional design that is commonly employed with video gaming consoles or the like. The second power cord 116 is electrically coupled to the collar 84 in the cylinder 72 and the second power cord 116 has a distal end 118 with respect to the collar 84. The second power cord 116 extends outwardly through the exit 110 in the outer wall 60 of the tube 98 such that the distal end 118 of the second power cord 116 is exposed with respect to the tube 98. A female plug 120 is electrically coupled to the distal end 118 of the second power cord 116 thereby facilitating the female plug 120 to insertably receive a power cord 122 of the virtual reality headset 18. Furthermore, the female plug 120 may be a propriety power plug for the virtual reality headset 18 that would otherwise be located on a video game console, for example.

A plurality of cable retractors 124 is provided and each of the cable retractors 124 is coupled to the tube 98. Each of the cable retractors 124 is biased to retract toward the tube 98 and each of the cable retractors 124 is urgeable into a lengthened condition for extending away from the tube 98. Each of the cable retractors 124 releasably engages the power cord 122 of the virtual reality headset 18. As is most clearly shown in FIG. 6, the power cord 122 of the virtual reality headset 18 is suspended from the ceiling 14 while a user 126 is wearing the virtual reality headset 18. In this way the plurality of cable retractors 124 inhibit the user 126 from tripping over the power cord 122 of the virtual reality headset 18, as is commonly occurs when the power cord 122 of the virtual reality headset 18 is plugged into the video gaming console.

Each of the cable retractors 124 has a coupled end 128 and an engaging end 130. The coupled end 100 of each of the cable retractors 124 releasably engages a respective one of the adjustment holes 112 in the outer wall 60 of the tube 98. Additionally, the cable retractors 124 can be attached to any of the adjustment holes 112 to accommodate the preferences of a variety of users. The engaging end 130 of each of the cable retractors 124 is releasably attachable to the power cord 122 of the virtual reality headset 18. Each of the cable retractors 124 includes an upper portion 132 attached to the tube 98 and a lower portion 134 extending away from a spool 136 that either releases or retracts the lower portion 134 to adjust the overall length of the cable retractors 124. Furthermore, the coupled end 100 of each of the cable retractors 124 includes a gripping element 138, such as a pair of spring loaded jaws for example, for releasably gripping the power cord 122 of the virtual reality headset 18.

The virtual reality headset 18 includes a harness 140 that extends over the user's head 142 when the user 126 wears the virtual reality headset 18. A jerk stopper 144 is included that comprises a cord 146 that is attached to the harness 140 such that the jerk stopper 144 is positioned on top of the user's head 142 when the virtual reality headset 18 is worn. The jerk stopper 144 includes a coupler 148 that is attached to a distal end 150 of the cord 146 with respect to the harness 140. The coupler 148 is releasably attachable to the power cord 122 of the virtual reality headset 18. In this way any tugging of the power cord 122 of the virtual reality headset 18 that is produced by the user 126 moving around is transferred into the harness 140 rather than on an attachment between the virtual reality headset 18 and the power cord 122 of the virtual reality headset 18.

In use, the fastener 12 is fastened to the ceiling 14 at a predetermined location and the mounting unit 26 is attached to the fastener 12. The first power cord 88 is plugged into the power source 90 and the power cord 122 for the virtual reality headset 18 is plugged into the second power cord 116. Additionally, the power cord 122 for the virtual reality headset 18 is attached to each of the cable retractors 124. In this way the power cord 122 for the virtual reality headset 18 is suspended from the ceiling 14 to inhibit the user 126 from tripping on the power cord 122 for the virtual reality headset 18. Furthermore, the tube 98 rotates in the collar 84 as the user 126 moves around thereby facilitating the user 126 to move without being impeded by the power cord 122 of the virtual reality headset 18.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A cable management assembly for facilitating cables for a virtual reality headset to be suspended from a ceiling, said assembly comprising:
   a fastener being attachable to a ceiling of a room;
   a mounting unit having a plurality of feet and a coupler, said coupler being matable to said fastener having each of said feet abutting the ceiling;
   a cylinder being attached to said mounting unit;
   a first power cord being integrated into said mounting unit thereby facilitating said first power cord to be plugged into a power source comprising a female electrical outlet;
   a tube being rotatably attached to said cylinder thereby facilitating said tube to be rotated about a central axis of said cylinder, said tube being bent to extend laterally away from said cylinder;
   a second power cord extending through said tube and into said cylinder, said second power cord being in electrical communication with said first power cord thereby facilitating said second power cord to receive electrical power from the female electrical outlet, said second power cord being pluggable into a virtual reality headset thereby facilitating said second power cord to supply electrical power to the virtual reality headset; and
   a plurality of cable retractors, each of said cable retractors being coupled to said tube, each of said cable retractors being biased to retract toward said tube, each of said cable retractors being urgeable into a lengthened condition for extending away from said tube, each of said cable retractors releasably engaging the power cord of the virtual reality headset wherein said plurality of cable retractors is configured to inhibit a user of the virtual reality headset from tripping over the power cord of the virtual reality headset.

2. The assembly according to claim 1, wherein said fastener has a first end and a second end, said fastener having a curve integrated therein extending from said first end toward said second end such that said first end is directed toward said second end thereby facilitating said fastener to define a hook, said fastener being threaded adjacent to said second end thereby facilitating said second end to penetrate the ceiling having said fastener threadably engaging the ceiling.

3. The assembly according to claim 1, wherein said mounting unit comprises:
- a plate having a top surface and a bottom surface, said plate having a plurality of holes each extending through said top surface and said bottom surface, said holes being positioned on opposing sides of a center of said plate, said plate having an aperture extending through said top surface and said bottom surface, said aperture being centrally positioned on said plate; and
- a plurality of arms, each of said arms having a primary end and a secondary end, each of said arms having a first curve being spaced from said primary end, each of said arms having a second curve being spaced from said secondary end such that each of said arms has a U-shape, a central portion of each of said arms being attached to said top surface of said plate such that each of said primary end and said secondary end of each of said arms is directed upwardly from said top surface, said pair of arms being oriented on said top surface of said plate such that said central portion of each of said arms defines an X-shape, said plurality of arms having an aperture extending through said central portion of each of said arms, said aperture in said plurality of arms being aligned with said aperture in said plate.

4. The assembly according to claim 3, wherein said mounting unit includes a plurality of cups, each of said cups having a top wall and an outer wall extending downwardly from said top wall, each of said cups insertably receiving a respective one of said primary end or said secondary end of a respective one of said arms such that said top wall of each of said cups defines a respective one of said feet associated with said mounting unit thereby facilitating said top wall to abut the ceiling, each of said cups being comprised of a resiliently compressible material thereby facilitating said top wall of each of said cups to frictionally engage the ceiling.

5. The assembly according to claim 3, wherein said mounting unit includes a U-bolt having a curved portion extending between each of a first threaded portion and a second threaded portion, each of said first threaded portion and said second threaded portion being extendable through a respective one of said holes in said plate having said curved portion being spaced from said top surface of said plate such that said U-bolt defines said coupler, said curved portion being positionable in said curve of said fastener thereby securing said mounting unit to the ceiling.

6. The assembly according to claim 5, wherein said mounting unit includes a pair of nuts, each of said nuts being threadable onto a respective one of said first threaded portion and said second threaded portion of said U-bolt having each of said nuts abutting said bottom surface of said plate for securing said U-bolt in said plate.

7. The assembly according to claim 3, wherein said cylinder has an upper portion being fixed said mounting unit and a lower portion being attached to said upper portion, said upper portion being attached to said bottom surface of said plate, said lower portion extending downwardly from said upper portion, said lower portion having a distal end with respect to said upper portion, said cylinder being substantially hollow, said distal end having an opening extending into an interior of said cylinder.

8. The assembly according to claim 7, further comprising:
- a contact plate being positioned within said lower portion of said cylinder, said contact plate being comprised of an electrically conductive material;
- a collar being rotatably disposed within said cylinder, said collar being positioned between said contact plate and said distal end of said cylinder, said collar being comprised of an electrically conductive material, said collar being in electrical communication with said contact plate; and
- a bearing being positioned within said cylinder, said bearing being positioned between said collar and said distal end of said cylinder, said bearing surrounding said opening in said distal end of said cylinder.

9. The assembly according to claim 8, wherein:
said first power cord is electrically coupled to said contact plate in said cylinder, said first power cord having a distal end with respect to said mounting unit, said first power cord having a male plug being electrically coupled to said distal end of said first power cord such that said male plug is pluggable into the female electrical outlet; and
said second power cord is electrically coupled to said collar in said cylinder, said second power cord having a distal end with respect to said collar, said second power cord extending outwardly through said exit in said outer wall of said tube such that said distal end of said second power cord is exposed with respect to said tube, said second power cord having a female plug being electrically coupled to said distal end of said second power cord thereby facilitating said female plug to insertably receive a power cord of the virtual reality headset.

10. The assembly according to claim 3, wherein each of said cable retractors having a coupled end and an engaging end, said coupled end of each of said cable retractors engaging a respective one of said adjustment holes in said outer wall of said tube, said engaging end of each of said cable retractors being releasably attachable to the power cord of the virtual reality headset.

11. A cable management assembly for facilitating cables for a virtual reality headset to be suspended from a ceiling, said assembly comprising:
- a fastener being attachable to a ceiling of a room, said fastener having a first end and a second end, said fastener having a curve integrated therein extending from said first end toward said second end such that said first end is directed toward said second end thereby facilitating said fastener to define a hook, said fastener being threaded adjacent to said second end thereby facilitating said second end to penetrate the ceiling having said fastener threadably engaging the ceiling;
- a mounting unit having a plurality of feet and a coupler, said coupler being matable to said fastener having each of said feet abutting the ceiling, said mounting unit comprising:
  - a plate having a top surface and a bottom surface, said plate having a plurality of holes each extending through said top surface and said bottom surface, said holes being positioned on opposing sides of a center of said plate, said plate having an aperture extending through said top surface and said bottom surface, said aperture being centrally positioned on said plate;
  - a plurality of arms, each of said arms having a primary end and a secondary end, each of said arms having a first curve being spaced from said primary end, each of said arms having a second curve being spaced from said secondary end such that each of said arms has a U-shape, a central portion of each of said arms being attached to said top surface of said plate such that each of said primary end and said secondary end of each of said arms is directed upwardly from said top surface, said pair of arms being oriented on said top surface of said plate such that said central portion of each of said arms defines an X-shape, said plurality of arms having an aperture extending through said central portion of each of said arms, said aperture in said plurality of arms being aligned with said aperture in said plate;

a plurality of cups, each of said cups having a top wall and an outer wall extending downwardly from said top wall, each of said cups insertably receiving a respective one of said primary end or said secondary end of a respective one of said arms such that said top wall of each of said cups defines a respective one of said feet associated with said mounting unit thereby facilitating said top wall to abut the ceiling, each of said cups being comprised of a resiliently compressible material thereby facilitating said top wall of each of said cups to frictionally engage the ceiling;

a U-bolt having a curved portion extending between each of a first threaded portion and a second threaded portion, each of said first threaded portion and said second threaded portion being extendable through a respective one of said holes in said plate having said curved portion being spaced from said top surface of said plate such that said U-bolt defines said coupler, said curved portion being positionable in said curve of said fastener thereby securing said mounting unit to the ceiling; and a pair of nuts, each of said nuts being threadable onto a respective one of said first threaded portion and said second threaded portion of said U-bolt having each of said nuts abutting said bottom surface of said plate for securing said U-bolt in said plate;

a cylinder being attached to said mounting unit, said cylinder having an upper portion being fixed said mounting unit and a lower portion being attached to said upper portion, said upper portion being attached to said bottom surface of said plate, said lower portion extending downwardly from said upper portion, said lower portion having a distal end with respect to said upper portion, said cylinder being substantially hollow, said distal end having an opening extending into an interior of said cylinder;

a contact plate being positioned within said lower portion of said cylinder, said contact plate being comprised of an electrically conductive material;

a collar being rotatably disposed within said cylinder, said collar being positioned between said contact plate and said distal end of said cylinder, said collar being comprised of an electrically conductive material, said collar being in electrical communication with said contact plate;

a bearing being positioned within said cylinder, said bearing being positioned between said collar and said distal end of said cylinder, said bearing surrounding said opening in said distal end of said cylinder;

a first power cord being integrated into said mounting unit thereby facilitating said first power cord to be plugged into a power source comprising a female electrical outlet, said first power cord being electrically coupled to said contact plate in said cylinder, said first power cord having a distal end with respect to said mounting unit, said first power cord having a male plug being electrically coupled to said distal end of said first power cord such that said male plug is pluggable into the female electrical outlet;

a tube being rotatably attached to said cylinder thereby facilitating said tube to be rotated about a central axis of said cylinder, said tube having a coupled end, a free end and an outer wall extending between said coupled end and said free end, said tube having a pair of curves each being spaced from said coupled end, each of said curves having a radius being opposed with each other to define a first portion of said tube being perpendicularly oriented to a second portion of said tube, said coupled end being associated with said first portion, said free end being associated with said second portion, said first portion extending through said opening in said distal end of said cylinder and extending through said bearing in said cylinder, said coupled end being attached to said collar such that said tube is rotatably retained on said cylinder having said second portion of said tube extending along an axis being oriented parallel with said bottom surface of said plate, said outer wall of said tube having an exit extending into an interior of said tube, said exit being aligned with said a respective one of said curves in said tube, said outer wall of said tube having a plurality of adjustment holes each extending into said interior of said tube, said plurality of adjustment holes being arranged into a plurality of pairs of said adjustment holes, each of said pairs of adjustment holes being positioned on opposite sides of said outer wall with respect to each other such that each of said pairs of adjustment holes is aligned with each other, said pairs of adjustment holes being spaced apart from each other and being distributed along said second portion of said tube;

a second power cord extending through said tube and into said cylinder, said second power cord being in electrical communication with said first power cord thereby facilitating said second power cord to receive electrical power from the female electrical outlet, said second power cord being pluggable into a virtual reality headset thereby facilitating said second power cord to supply electrical power to the virtual reality headset, said second power cord being electrically coupled to said collar in said cylinder, said second power cord having a distal end with respect to said collar, said second power cord extending outwardly through said exit in said outer wall of said tube such that said distal end of said second power cord is exposed with respect to said tube, said second power cord having a female plug being electrically coupled to said distal end of said second power cord thereby facilitating said female plug to insertably receive a power cord of the virtual reality headset; and a plurality of cable retractors, each of said cable retractors being coupled to said tube, each of said cable retractors being biased to retract toward said tube, each of said cable retractors being urgeable into a lengthened condition for extending away from said tube, each of said cable retractors releasably engaging the power cord of the virtual reality headset wherein said plurality of cable retractors is configured to inhibit a user of the virtual reality headset from tripping over the power cord of the virtual reality headset, each of said cable retractors having a coupled end and an engaging end, said coupled end of each of said cable retractors engaging a respective one of said adjustment holes in said outer wall of said tube, said engaging end of each of said cable retractors being releasably attachable to the power cord of the virtual reality headset.

* * * * *